(12) United States Patent
Wang et al.

(10) Patent No.: US 11,687,336 B2
(45) Date of Patent: Jun. 27, 2023

(54) EXTENSIBLE MULTI-PRECISION DATA PIPELINE FOR COMPUTING NON-LINEAR AND ARITHMETIC FUNCTIONS IN ARTIFICIAL NEURAL NETWORKS

(71) Applicant: Black Sesame International Holding Limited, Santa Clara, CA (US)

(72) Inventors: Yi Wang, San Jose, CA (US); Zheng Qi, Cupertino, CA (US); Hui Wang, Sunnyvale, CA (US); Zheng Li, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 16/869,814

(22) Filed: May 8, 2020

(65) Prior Publication Data

US 2021/0349718 A1   Nov. 11, 2021

(51) Int. Cl.
*G06F 9/30*   (2018.01)
*G06N 3/08*   (2023.01)
*G06F 9/54*   (2006.01)
*G06F 9/38*   (2018.01)

(52) U.S. Cl.
CPC ........ *G06F 9/30036* (2013.01); *G06F 9/3001* (2013.01); *G06F 9/3877* (2013.01); *G06F 9/544* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 10,073,816 B1 * | 9/2018 | Lu | ............ | G06F 17/14 |
| 10,761,757 B2 * | 9/2020 | Nair | ............ | G06F 3/064 |
| 10,802,992 B2 * | 10/2020 | Yu | ............ | G06N 3/082 |
| 11,232,347 B2 * | 1/2022 | Lie | ............ | G06N 3/0454 |

(Continued)

FOREIGN PATENT DOCUMENTS

| | | | |
|---|---|---|---|
| CN | 102420747 A | * | 4/2012 |
| CN | 109543708 A | * | 3/2019 |

(Continued)

OTHER PUBLICATIONS

'How to Quantize Neural Networks with TensorFlow' by Pete Warden, May 3, 2016. (Year: 2016).*

(Continued)

*Primary Examiner* — Steven G Snyder
(74) *Attorney, Agent, or Firm* — Timothy T. Wang; Ni, Wang & Massand, PLLC (57) ABSTRACT

An extensible multi-precision data pipeline system, comprising, a local buffer that stores an input local data set in a local storage format, an input tensor shaper coupled to the local buffer that reads the input local data set and converts the input local data set into an input tensor data set having a tensor format of vector width N by tensor length L, a cascaded pipeline coupled to the input tensor shaper that routes the input tensor data set through at least one function stage resulting in an output tensor data set, an output tensor shaper coupled to the cascaded pipeline that converts the output tensor data set into an output local data set having the local storage format and wherein the output tensor shaper writes the output local data set to the local buffer.

26 Claims, 6 Drawing Sheets

(56) References Cited

U.S. PATENT DOCUMENTS

| | | | |
|---|---|---|---|
| 11,269,632 B1* | 3/2022 | AlBarakat | G06F 9/3861 |
| 11,321,805 B2* | 5/2022 | Mellempudi | G06F 7/501 |
| 11,537,864 B2* | 12/2022 | Mills | G06N 3/084 |
| 11,556,772 B2* | 1/2023 | Kundu | G06N 3/044 |
| 11,586,883 B2* | 2/2023 | Chung | G06F 9/54 |
| 2014/0181171 A1* | 6/2014 | Dourbal | G06F 17/16 708/607 |
| 2016/0013773 A1* | 1/2016 | Dourbal | G06F 17/16 708/209 |
| 2018/0046903 A1* | 2/2018 | Yao | G06N 3/0481 |
| 2018/0046913 A1* | 2/2018 | Yu | G06F 13/102 |
| 2018/0314940 A1* | 11/2018 | Kundu | G06N 3/044 |
| 2018/0341483 A1* | 11/2018 | Fowers | G06F 9/30192 |
| 2019/0042094 A1* | 2/2019 | Nair | G06F 3/064 |
| 2019/0130268 A1* | 5/2019 | Shiring | G06N 3/08 |
| 2019/0340214 A1* | 11/2019 | Gudovskiy | G06N 3/063 |
| 2019/0340492 A1* | 11/2019 | Burger | G06N 3/08 |
| 2019/0340454 A1* | 11/2019 | Burger | G06N 3/0454 |
| 2019/0354846 A1* | 11/2019 | Mellempudi | G06F 9/30014 |
| 2020/0183837 A1* | 6/2020 | Gu | G06N 3/0454 |
| 2020/0193273 A1* | 6/2020 | Chung | G06N 3/084 |
| 2020/0193274 A1* | 6/2020 | Darvish Rouhani | G06F 17/15 |
| 2020/0210839 A1* | 7/2020 | Lo | G06F 9/30025 |
| 2020/0210840 A1* | 7/2020 | Darvish Rouhani | G06N 3/082 |
| 2020/0226454 A1* | 7/2020 | Cambier | G06F 7/78 |
| 2020/0264876 A1* | 8/2020 | Lo | G06N 3/084 |
| 2020/0311569 A1* | 10/2020 | Ghosh | G06F 9/5038 |
| 2020/0311613 A1* | 10/2020 | Ma | G06N 20/20 |
| 2020/0380341 A1* | 12/2020 | Lie | G06F 9/30087 |
| 2021/0110508 A1* | 4/2021 | Mellempudi | G06N 3/045 |
| 2021/0125033 A1* | 4/2021 | Zhou | G06F 5/01 |
| 2021/0133984 A1* | 5/2021 | Sun | G06K 9/6263 |
| 2021/0158135 A1* | 5/2021 | Mills | G06F 9/545 |
| 2021/0350280 A1* | 11/2021 | Montanari | G06N 20/00 |
| 2022/0138553 A1* | 5/2022 | Mills | G06N 3/08 706/16 |
| 2022/0156575 A1* | 5/2022 | Mills | G06N 3/084 |
| 2022/0327656 A1* | 10/2022 | Mellempudi | G06N 3/063 |
| 2023/0037227 A1* | 2/2023 | Narayan | G06F 7/483 |
| 2023/0087364 A1* | 3/2023 | Kundu | G06N 3/08 706/25 |

FOREIGN PATENT DOCUMENTS

| | | | | |
|---|---|---|---|---|
| CN | 110537193 A | * | 12/2019 | G06K 9/66 |
| CN | 110826689 A | * | 2/2020 | |
| CN | 112001481 A | * | 11/2020 | |
| CN | 112183468 A | * | 1/2021 | |
| CN | 113273082 A | * | 8/2021 | G06N 5/046 |
| WO | WO-2018193906 A1 | * | 10/2018 | G06N 3/04 |

OTHER PUBLICATIONS

'Hardware-Oriented Approximation of Convolutional Neural Networks' by Philipp Gysel et al., Oct. 20, 2016. (Year: 2016).*
'Shifted and Squeezed 8-Bit Floating Point Format for Low-Precision Training of Deep Neural Networks' by Leopold Cambier et al., Jan. 16, 2020. (Year: 2020).*
'Format Abstraction for Sparse Tensor Algebra Compilers' by Stephen Chou et al., Proc. ACM Program. Lang., vol. 2, No. OOPSLA, Article 123. Publication date: Nov. 2018. (Year: 2018).*
'Automatic Generation of Efficient Sparse Tensor Format Conversion Routines' by Stephen Chou et al., PLDI '20, Jun. 15-20, 2020, London, UK. (Year: 2020).*
'SPARSKIT: a basic tool kit for sparse matrix computations—Version 2' by Youcef Saad, Jun. 6, 1994. (Year: 1994).*

* cited by examiner

EXTENSIBLE MULTI-PRECISION DATA PIPELINE FOR COMPUTING NON-LINEAR AND ARITHMETIC FUNCTIONS IN ARTIFICIAL NEURAL NETWORKS

BACKGROUND

Technical Field

The instant disclosure is related to artificial neural networks and specifically providing an extensible multi-precision data pipeline for computing non-linear and arithmetic functions in artificial neural networks.

Background

Non-linear functions are utilized in artificial neural networks. Most current artificial neural networks rely on the central processing unit (CPU) and/or graphical processing unit (GPU) architecture to perform non-linear functions which render low hardware utilization/efficiency and when most of the computations are conducted by the hardware application specific integrated circuit (ASIC), the data pipe is stopped or paused so that the intermediate computation can be return to the CPU/GPU to perform the non-linear computation, and then uses CPU/GPU to calculate the final results or send back the intermediate result back to the hardware again. There is lack of a generic architecture which may provide a universal solution to satisfy the various demands for different artificial neural network architectures.

SUMMARY

An example extensible multi-precision data pipeline system, comprising at least one of, a local buffer that stores an input local data set in a local storage format, an input tensor shaper coupled to the local buffer that reads the input local data set and converts the input local data set into an input tensor data set having a tensor format of vector width N by tensor length L, a cascaded pipeline coupled to the input tensor shaper that routes the input tensor data set through at least one function stage resulting in an output tensor data set, an output tensor shaper coupled to the cascaded pipeline that converts the output tensor data set into an output local data set having the local storage format and wherein the output tensor shaper writes the output local data set to the local buffer.

An example extensible multi-precision data pipeline method, comprising at least one of, reading an input local data set that is stored in a local storage format, converting the input local data set into an input tensor data set having a tensor format of vector width N by tensor length L, routing the input tensor data set through at least one function stage resulting in an output tensor data set, converting the output tensor data set into an output local data set having the local storage format and writing the output local data set to a local buffer.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
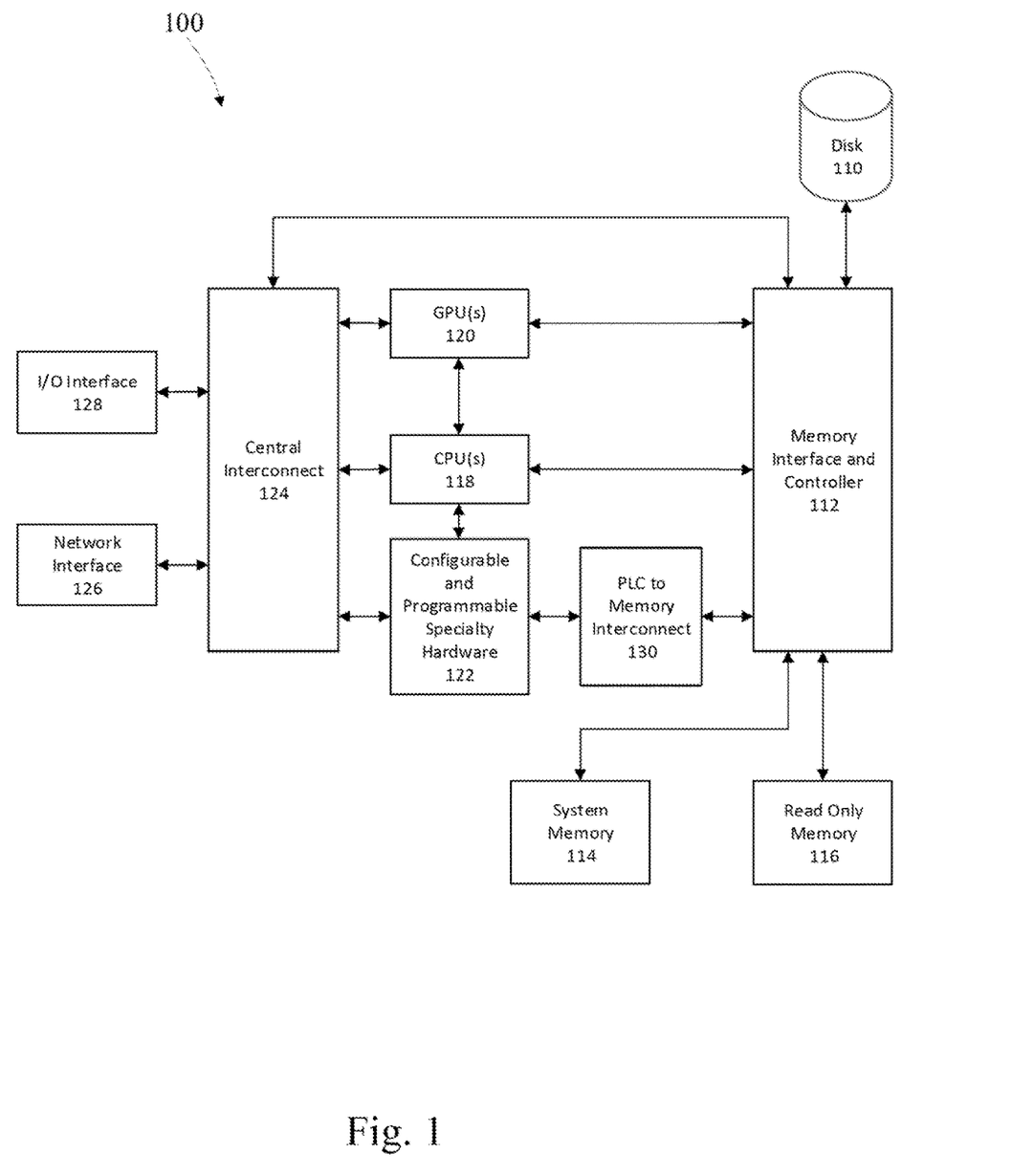
FIG. 1 is a first example system diagram in accordance with one embodiment of the disclosure.
Figure 6:
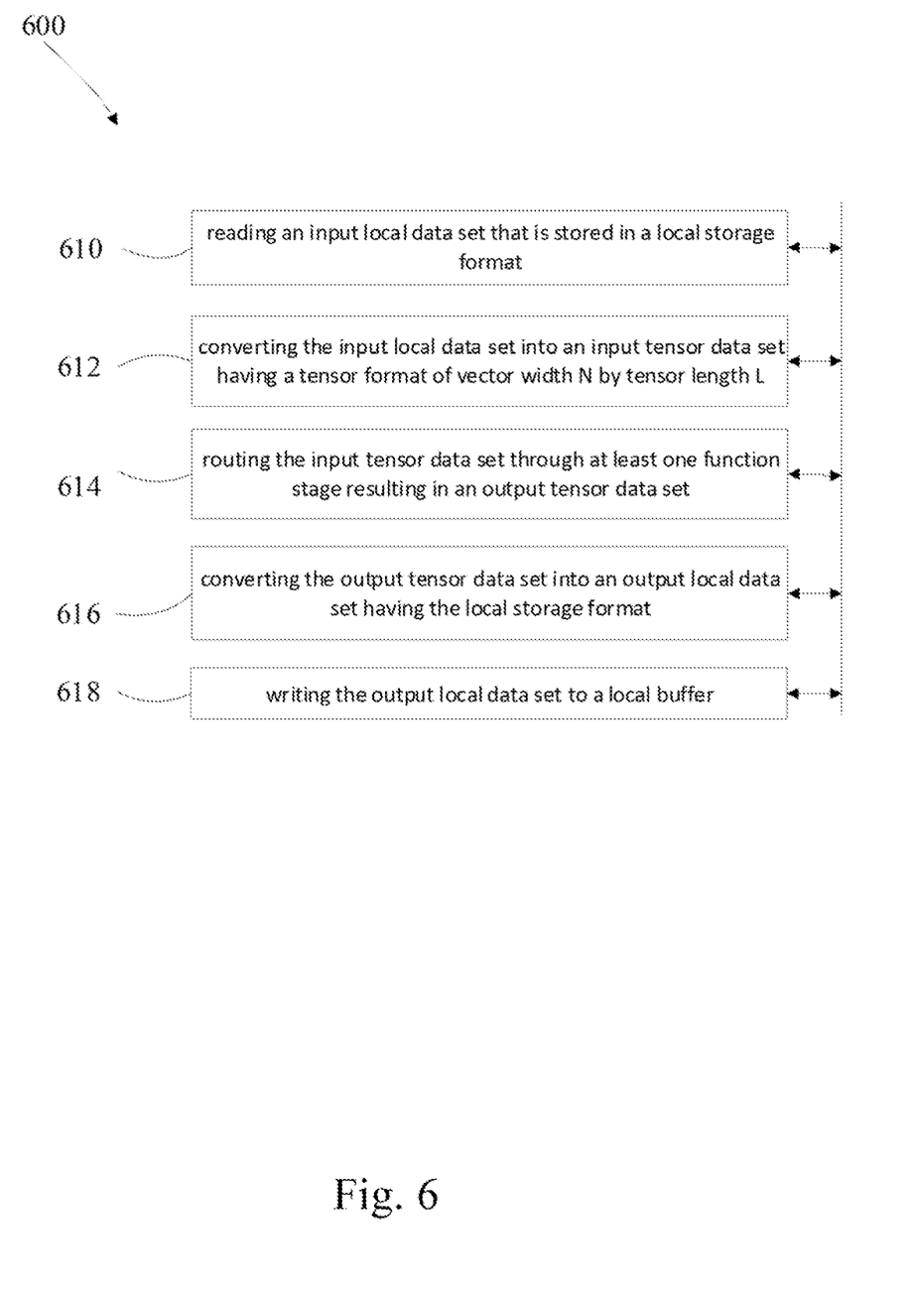
FIG. 6 is an example method in accordance with one embodiment of the disclosure.

FIG. 1 depicts an example hybrid computational system 100 that may be used to implement neural nets associated with the operation of one or more portions or steps of process 600. In this example, the processors associated with the hybrid system comprise a configurable and programmable specialty hardware 122, a graphical processor unit (GPU) 120 and a central processing unit (CPU) 118.

The CPU 118, GPU 120 and configurable and programmable specialty hardware 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. A configurable and programmable device, has the ability to be reconfigured and perform in hardwired circuit fashion any function that may be programmed into a CPU or GPU. Since the programming of a configurable and programmable specialty hardware is in circuit form, its speed is many times faster than a CPU and appreciably faster than a GPU.

The graphical processor unit 120, central processing unit 118 and configurable and programmable specialty hardware device 122 are connected and are connected to a memory interface controller 112. The configurable and programmable specialty hardware device is connected to the memory interface through a programmable logic circuit to memory interconnect 130. This additional device is utilized due to the fact that the configurable and programmable specialty hardware device is operating with a very large bandwidth and to minimize the circuitry utilized from the configurable and programmable specialty hardware device to perform memory tasks. The memory and interface controller 112 is additionally connected to persistent memory disk 110, system memory 114 and read only memory (ROM) 116.

The system of FIG. 1A may be utilized for programming and training the configurable and programmable specialty hardware device. The GPU functions well with unstructured data and may be utilized for training, once the data has been trained a deterministic inference model may be found and the CPU may program the configurable and programmable specialty hardware device with the model data determined by the GPU.

The memory interface and controller is connected to a central interconnect 124, the central interconnect is additionally connected to the GPU 120, CPU 118 and configurable and programmable specialty hardware device 122. The central interconnect 124 is additionally connected to the input and output interface 128 and the network interface 126.

Figure 2:
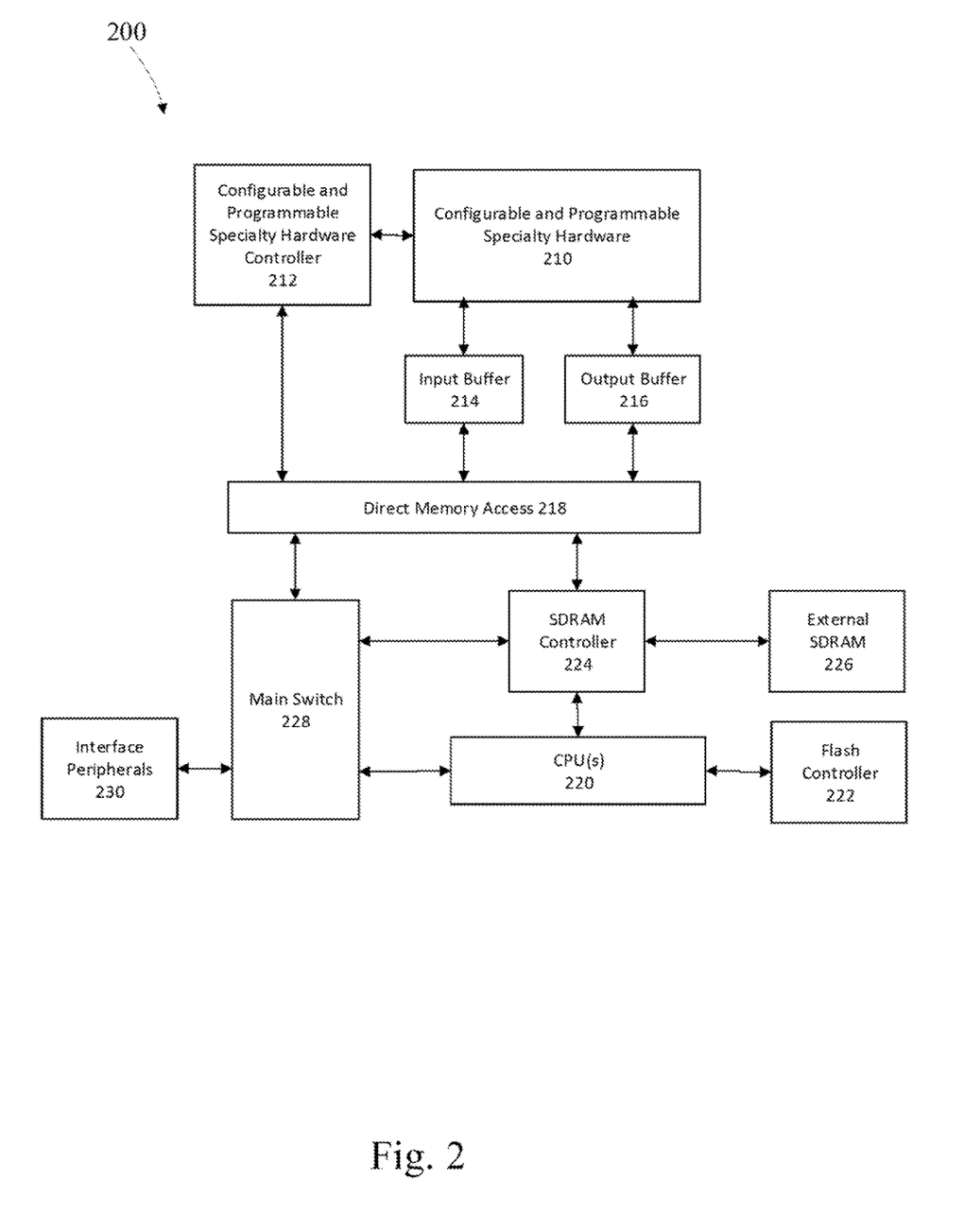
FIG. 2 is a second example system diagram in accordance with one embodiment of the disclosure.

FIG. 2 depicts a second example hybrid computational system 200 that may be used to implement neural nets associated with the operation of one or more portions or steps of process 600. In this example, the processors associated with the hybrid system comprise configurable and programmable specialty hardware device 210 and a central processing unit (CPU) 220.

The configurable and programmable specialty hardware device is electrically connected to a configurable and programmable specialty hardware device controller 212 which interfaces with a direct memory access (DMA) 218. The DMA is connected to input buffer 214 and output buffer 216, which are coupled to the configurable and programmable specialty hardware device to buffer data into and out of the configurable and programmable specialty hardware device respectively. The DMA 218 includes of two first in first out (FIFO) buffers one for the host CPU and the other for the configurable and programmable specialty hardware device, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the configurable and programmable specialty hardware device to the CPU 220, the SDRAM controller is also connected to external SDRAM 226 and the CPU 220. The main switch 228 is connected to the peripherals interface 230. A flash controller 222 controls persistent memory and is connected to the CPU 220.

Figure 3:
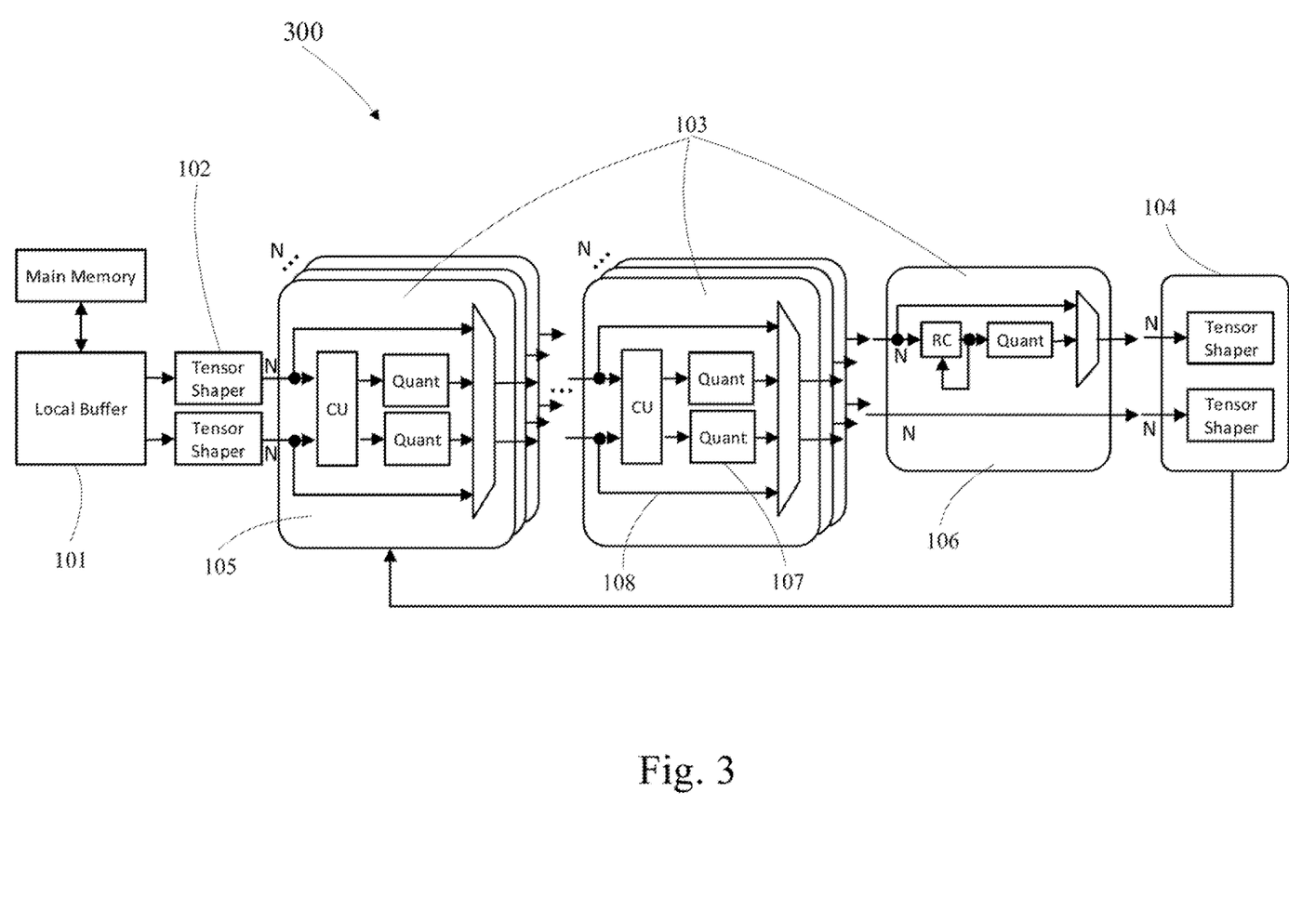
FIG. 3 is a an example architecture overview in accordance with one embodiment of the disclosure.

As disclosed in FIG. 3. The extensible multi-precision data pipeline (EMDP) includes a local buffer (101) which can store/load data to/from a main memory. Two input tensor shapers (102) convert the data from their storage format in the local buffer to a 2-dimensional, N-by-L, tensor format, where the two dimensions are vector width (N) and tensor length (L). The cascaded pipeline (103) includes multiple computational stages. An output tensor shaper (104) transforms the resulting tensor to the storage format in the local buffer and writes the result back to the local buffer. Computational stage takes up to 2 N-by-L tensors as the input, applying a specific computation tasks (function CU or function RC in FIG. 3) to the input tensor, accordingly, the computational function, and the computation outputs up to 2 tensors. The output tensor may be quantized in a quantization stage (107) prior to input into the next stage, this allows the processing precision of the computational stages to be independent. From one input tensor to one output tensor, there is an optional direct path (108) which bypasses the computation and quantization stages. When the assigned computation capability is not needed, the bypass paths are used to reduce the processing latency and reduce power consumption.

There are two basic types of computational stages, element-wise computation stage (105) and tensor-wise computation stage (106). An element-wise computation stage (105) takes one or two 2-dimensional tensors as input, processes the tensor in an element by element fashion along the tensor length direction. As disclosed in FIG. 3, 105, one element-wise computation stage comprises N data processing slices. Slice are processed independently. The outputs are, therefore, one tensor or two tensors with the identical dimensions of the input tensors. A tensor-wise computation stage (106) processes the tensor and generates outputs that have a lower dimension than the input tensor. The tensor-wise computation stages suited to implement the Reduction Operators such as Reduction ADD, Reduction SUBSTRACTION, Reduction Minimum, Reduction Maximum etc. Tensor-wise computation stages process one tensor at a time and generates a valid output after it processed the last the element of the input tensor.

The number of the computation stages, the specific functions carried by the computation stage as well as the order of the different functional stages in the pipelined cascade are designed according to the specific application.

Figure 4:
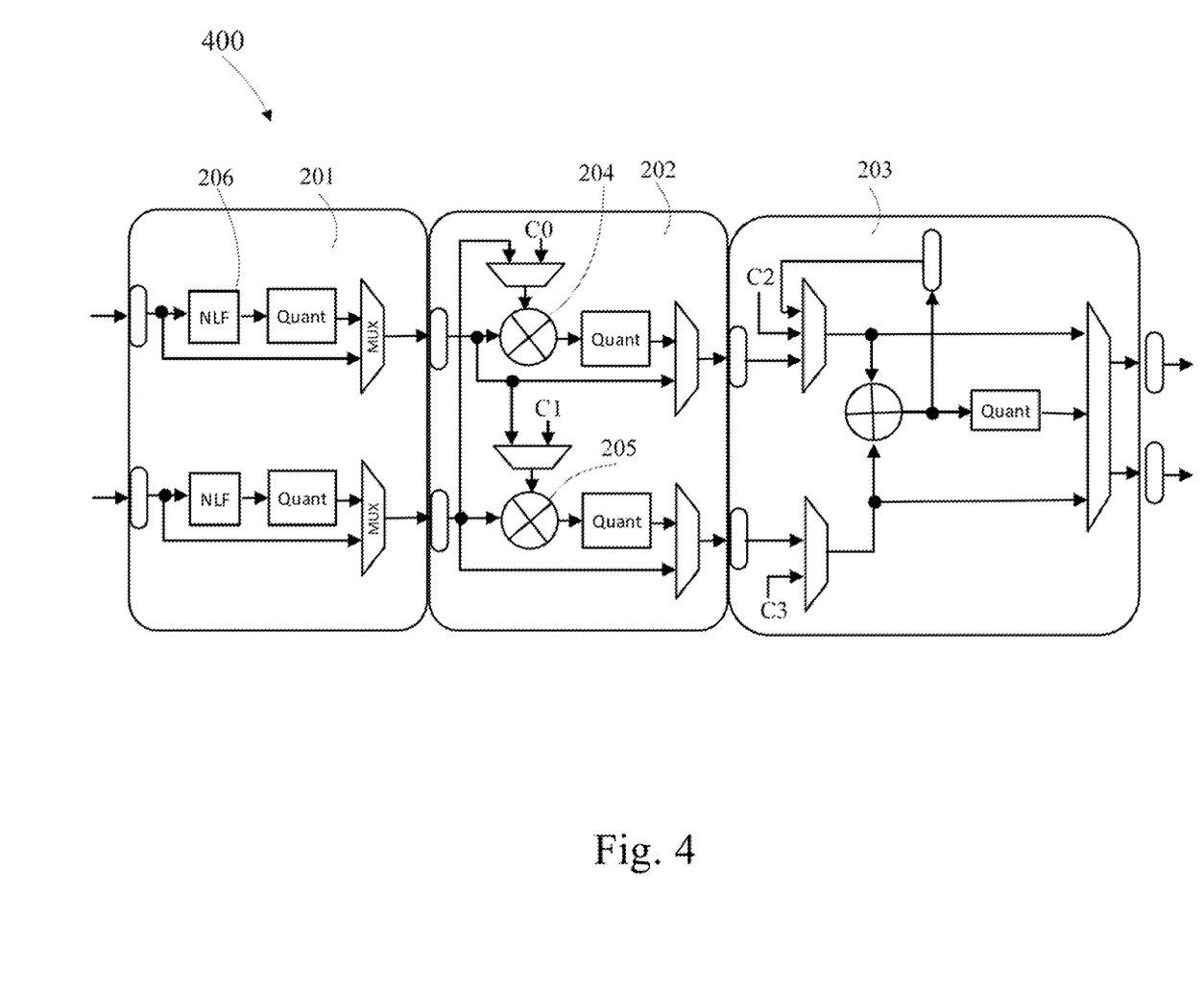
FIG. 4 is an example extensible multi-precision data processing pipeline slice in accordance with one embodiment of the disclosure.

FIG. 4 depicts the EMDP data path which is designed specifically to satisfy the computation demands from a machine learning artificial neural network. The first stage (201) of the data path performs the non-linear functions (NLF). Example of non-linear functions for the artificial neural network are sigmoid, tanh, exp (inverse exp), ln, square-root (inverse square-root), and reciprocal functions. The disclosed implementation architecture supports non-linear functions such as previously listed and can be extended to support other non-linear functions. Since the non-linear operations are unary operations, as disclosed in FIG. 4, the computation stage that implements the non-linear functions has up to two independent data processing channels. Channels are able to apply the non-linear operation independently upon its input tensor. The second stage (202) is a SCALE/Multiplication stage. There are two multipliers (204, 205) in this stage. Multipliers receive one of the input tensors as its primary input. The other input is configurable at runtime, which can be either the other input tensor or a loadable constant value (C0 or C1). The configurable architecture allows the same stage to perform different computations, namely, either two independent tensor scaling operations, multiply a constant to the elements of the tensor, or element-wise multiplication with two input tensors, optionally, with one scaling operation upon one of the input tensors at the same time. The third stage (203) which is an addition-based stage, utilizes an adder as the base arithmetic unit. It supports the addition-based unary operation such as addition, subtraction, comparison, minimum and maximum. With the storage element added, the stage is also performing the accumulation along the tensor depth direction. With cascading computational stages in the data path, the disclosed architecture can encapsulate multiple arithmetic operations into a fused operation, an input data enters the EMDP once, and EMDP generates the result of a sequence of arithmetic operations. A tensor-wise computation stage (106) follows the third stage (203), i.e. the addition-based stage, An example fused operation of the disclosed example can be expressed as in a more generic format:

$$O = R(C0 \times f(A) * C1 \times g(B))$$

Where

A, B and O are vectors extracted from the input and output tensors f and g are exp, log, sqrt, tanh, sigmoid, unit functions C0 and C1 are scaling constants '*' is vectored 'add', 'sub', 'mul', 'cmp', 'min', 'max' functions R is the tensor reduction function applied to the tensor Considering that an artificial neural network usually conducts massive data processing, relaxing the storage allotment for intermediate results leads to saving in memory footprint such as the local buffer (101) in FIG. 3. By reducing the memory access, the fused operations provide faster computation and less power consumption.

Inside the computational stages, the disclosed EMDP architecture utilizes integer arithmetic units to perform the computation so that the hardware cost is minimized. The mixed precision is supported by in two ways an input tensor shaper and an output tensor shaper.

The input tensor shaper (102) and output tensor shaper (104) are designed with data type conversion logic. Therefore, the EMDP takes input data format such as floating 32, floating 16, 32-bit fixed-point, 16-bit fixed-point, 8-bit fixed-point and etc., and converts the data to its corresponding fixed-point representation. The data type conversion may result in a smaller dynamic range or lead to loss of computation precision. In artificial neural networks, the dynamic region of certain layer is intentionally confined to a smaller range. The smaller dynamic range leads to a trivial impact on the result. The bit width of the integer arithmetic unit is designed to be wide enough to provide the target precision.

Another feature of the artificial neural network is that for the inference mode, which is the most targeted mode of hardware-based platforms, the system has pre-knowledge of the dynamic range of a computational task. By taking advantage of this knowledge to adjust the quantization stage (107) setting, computational stages use locally optimized data representation to conduct the computation. While performing the computation with the integer arithmetic unit, a computational stage keeps the fixed-point notation of the value at intermediate steps, i.e. input value, computation result and output value. The locally optimized data representation such as fixed-point is defined as to assign as less as integer bit to satisfy the dynamic range to avoid overflow. Therefore, the computation is done at the highest allowable precision, the maximum available bits to represent the fraction portion of a value.

The disclosed mixed precision mechanism reduces the hardware resources to implement pure floating-point or fixed-point arithmetic which is used to for large dynamic range and is not needed for most artificial neural network applications. The disclosed system and method provides more flexibility to the precision optimization than the pure integer representations, i.e. INT32, INT16 and INT8, which uses the implicit arithmetic point notation. Therefore, the disclosed mixed precision mechanism is able to achieve higher computational precision when compared to a pure integer implementation using similar hardware resources.

As one of the components of the disclosed EMDP architecture, a generic non-linear function is also disclosed here which can perform the non-linear functions that are commonly used by artificial neural networks, is extensible in terms of add/remove the type of non-linear functions without architectural change, extensible in terms of adjusting the computation precision and extensible in terms of the hardware cost is linearly increasing with the number of non-linear function supported and the higher computation precision.

Figure 5:
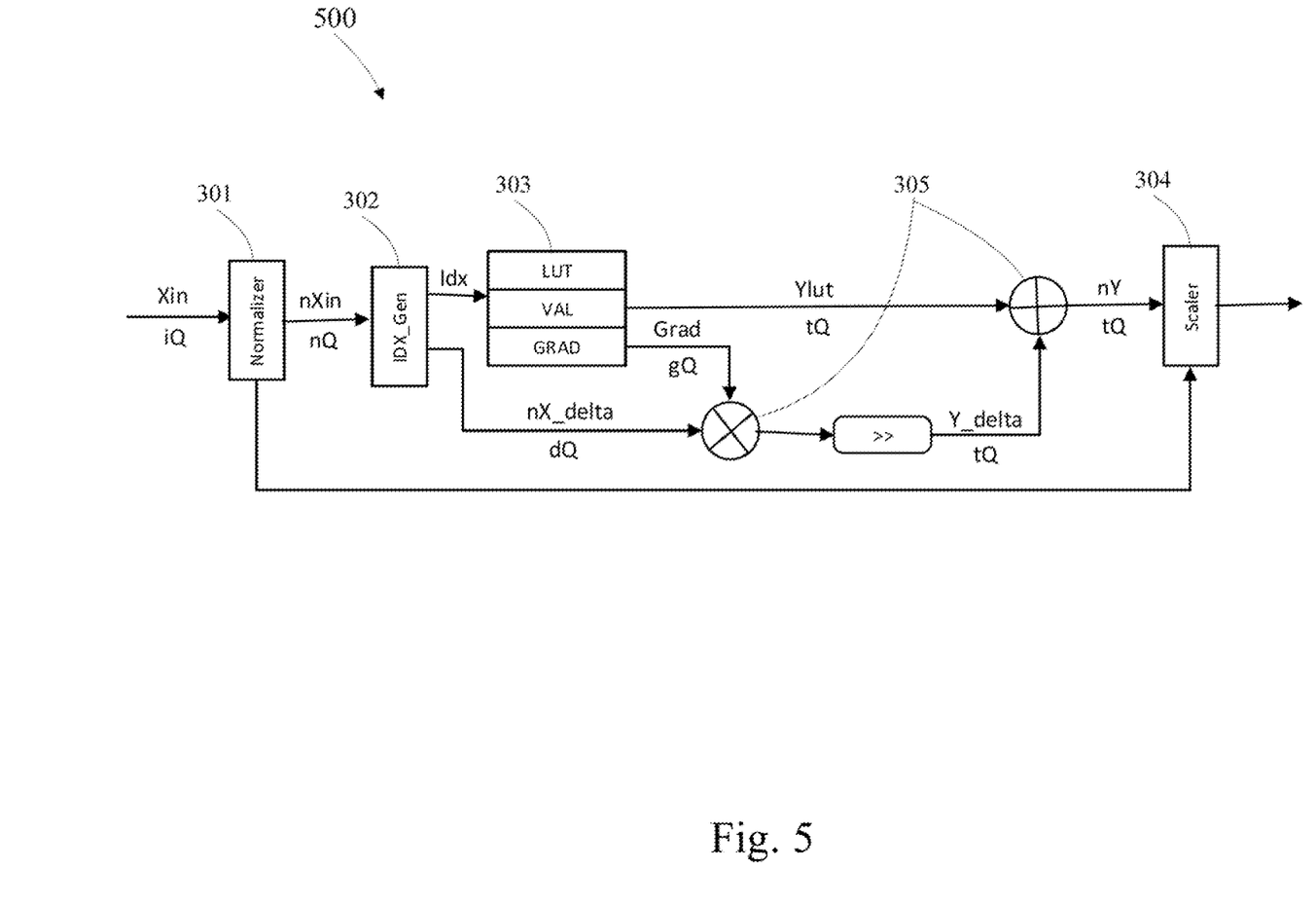
FIG. 5 is an example look-up table based non-linear function implementation architecture in accordance with one embodiment of the disclosure.

Piece-wise linear approximation may be the most cost-efficient algorithm that satisfies the precision. As disclosed in FIG. 5, the non-linear function architecture has four logic stages, namely, normalization (301), which normalizes the relatively large input range into a smaller range. For example, the normalizer breaks the input value Xin=2^k*nXin, into a 3D cube (sign, k, nXin), where sign and k are the scaling factor which are used in the scaling correction stage (304), nXin is the normalized value in a stored in the fixed point format. For the sake of the nQ in FIG. 5 is the Q factor of the fixed-point value. Tensor nQ is a 2D tensor nQ=(m, n), where m is the number of integer bits of the value and n is the number of fractional bits. Non-linear function utilize pre-defined nQ. For different non-linear functions, the nQs may not be the same.

The second stage is the table look-up stage, which has two building blocks, IDX_GEN (302) and LUT (303). The LUT is a piece of memory within which a fixed number of entries are assigned to one specific non-linear function. For example, N entries are assigned to a non-linear function f(x), $x<=x_{min}$ and $x>=x_{max}$. The basic LUT table construction method is a linear sampling, of which, $x_i=x_{min}+(x_{max}-x_{min})/N*i$, where $0<=I<N$. The entry of the LUT stores the actual non-linear results $f(x_i)$. Here, $x_i$ is called one input sample and $f(x_i)$ is an output sample. For certain functions where the gradient changes abruptly inside the normalized input range, i.e. sigmoid and tanh, the normalized input range is divided into several segments so that the variation of the gradients with the input segment that is shortened so that the piece-wise linear algorithm can produce better precision.

The IDX_Gen (302) maps a normalized input value $x_i<=nXin<x_{i+1}$ to the index which points to the memory location stores $f(x_i)$. With carefully designed storage, the index generation is conducted by simple bitwise operation upon the input value so that it reduces hardware resources. IDX_Gen outputs the difference between the input value and the referenced value used to lookup $nX\_delta=nXin-x_i$.

LUT entries have associated information in the memory which is the gradient of the specific function in the sampling range. For example, given the element stores the value $f(x_i)$, the $(i+1)^{th}$ is storing the value $f(x_{i+1})$. The gradient of the sampling range $(x_i, x_{i+1})$ is $Grad=(f(x_{i+1})-f(x_i))/(x_{i+1}-x_i)$. The LUT uses the same index to address the value and the corresponding Grad. The value and Grad are stored in a fixed-point format. In FIG. 5, tQ represents the Q factor of the value and gQ represents the Q factor of the gradient.

In order to reduce hardware, either the gradient or nX_delta may have a reduced bit width. For example, a practice LUT implementation which achieves 12 bit precision peak signal to noise ratio (PSNR)>72 dB for the 8 listed non-linear functions needs 15-bit value while 8-bit gradient and 8-bit nX delta are enough to achieve the target peak signal to noise ratio.

The look-up stage generates 3 outputs, Ylut, Grad and nX_delta. Ylut is the lookup value for function an input value $x_i<=nXin<x_{i+1}$. $Ylut=f(x_i)$. Grad is the gradient of the function f(x) at the sampling range $(x_i, x_{i+1})$. nX_delta is the difference between the actual input value and the associated sampling input.

The third stage (305) is the piece-wise interpolation stage which implement the piece-wise interpolation algorithm where the output $nY=Ylut+Grad*nX\_delta$.

The last stage of the non-linear function is the scaling correction stage (304), which corrects the normalized lookup result back to the result based on the actual input value. The scaler logic is derived based on the specific non-linear functions. For example, for the reciprocal function $f(x)=1/x$, when $x=2^k*nXin$, $f(x)=2^{-k}*nY$, which can be implemented by a simple hardware shifter. The logrithm function $f(x)=\ln(x)=\ln(2^k*nXin)=\ln(2^k)+\ln(nXin)=\ln(2^k)+nY$. Since k is an integer and has bounded range, the $\ln(2^k)$ portion of the scaling correction are pre-calculated constants in a small lookup-table.

The disclosed non-linear function architecture may achieve arbitrary precision. In order to increase the precision, a designer may increase the number of assigned LUT entries for specific non-linear functions and/or increase the bit width of the data units. To reduce the hardware cost, a designer may reduce the number of LUT entries and reduce the bit width at the cost of less computational precision.

APPLICATION EXAMPLE

The disclosed EMDP architecture is capable to perform various of operations that used by an artificial neural network. For simple operations, the flow is quite straight forward. Basically, the input tensor is traverse the EMDP data path once with the target arithmetic stages activated, the result tensor is available after the last element reaches the output tensor shaper (104) stage. Those operations include unary operations, binary operations and reduction operations. Unary operations include tensor absolute value, negation, clamping, scaling, comparison, tensor tanh, sigmoid, exp, log, reciprocal, square root and the like. Binary operations include element-wise additions/subtraction, element-wise multiplication/division, element-wise minimum/maximum and the like. Reduction operations include reduction add, maximum/minimum element selection and the like.

The more complex operations may include multiple iterations, where iteration is defined as the input tensor pass through the EMDP data path once. In this disclosure, the implementation flow of one ANN operations is disclosed here as the application example:

The softmax operation assumes the input tensor is a 1-D vector, it computes:

$$\text{Softmax}(x_i) = \frac{e^{(x_i - x_{max})}}{\sum_{j=0}^{n} e^{(x_j - x_{max})}}$$

Based on the example EMDP implementation (FIG. 4), the softmax function can be done by the following iterations:

Iteration 1: computing the maximal value of the input vector using reduction MAX Iteration 2: subtract the maximal value from elements in the vector using vectored SUB Iteration 3: compute the exponent for values via vectored EXP and perform reduction ADD to compute the sum the exponents Iteration 4: calculate the scalar reciprocal of the sum and multiply (SCALE) exponent values by the reciprocal Due to the low performance-to-cost ratio of the software implementation on CPU/GPU, the artificial neural networks tends to favor hardware solutions with a configurable and programmable specialty hardware device or ASIC. Current hardware solutions focus on accelerating the computationally intensive functions like matrix multiplication and convolution. A complete neural network has more computation types than matrix-based operations. Such operations are non-linear function, element-wise arithmetic, vector-wise arithmetic, and even the matrix-vector multiplication. Some of the existing hardware solutions rely on CPU/GPU to conduct those functions, which make the solution not self-contained. Some of the solutions add hardware logic to support certain functions, for example, tanh or sigmoid as the activation functions. Due to lack of the generality, such solutions are limited to certain neural networks structures.

The extensible multi-precision data pipeline (EMDP) disclosed provides a generic ASIC/configurable and programmable specialty hardware device implementation architecture to handle the majority computation task of a hardware-based artificial neural networks solutions.

A runtime configurable element-wise data path is capable to conduct most common computations performed by artificial neural networks. The disclosed system and method is fully pipelined, bypass-able, an element-wise data path provides sustainable throughput while minimizing the latency per computational task. The vector processor architecture is extensible to meet higher the performance target by replicating an element-wise data path. The disclosed system and method allows efficient usage of memory bandwidth by fusing common operation sequences such as reducing the load/store overhead of an operation in general purpose CPU/GPU or digital signal processors (DSP), shares load/store bandwidth across multiple operations, allows for a continuous 3-D aware tensor data load/store pipeline and load/store operations with computation without the cost of an overhead cycle. The configurable quantization unit between the neighboring micro-stages allows local per-arithmetic function optimized precision, global per-task based precision optimization, seamless interfacing among mixed precision neural network layers and has a high performance/cost ratio when compared to a general purpose computation unit, such as a CPU/GPU.

An example extensible multi-precision data pipeline system, includes, a local buffer 101 that stores an input local data set in a local storage format, an input tensor shaper 102 coupled to the local buffer that reads the input local data set and converts the input local data set into an input tensor data set having a tensor format of vector width N by tensor length L. The system also includes a cascaded pipeline 103 coupled to the input tensor shaper that routes the input tensor data set through at least one function stage such as an element-wise computation stage 105 resulting in an output tensor data set, an output tensor shaper 104 coupled to the cascaded pipeline that converts the output tensor data set into an output local data set having the local storage format and wherein the output tensor shaper 104 writes the output local data set to the local buffer.

The system may also include an encapsulator coupled to the cascaded pipeline to fuse multiple function stages into a fused operation, an element-wise stage within the at least one function stage that processes the input tensor data set on an element by element basis along the tensor length L, a tensor-wise stage within the at least one function stage that processes the input tensor data set and a quantizing adjuster within the at least one function stage that dynamically adjusts quantization through the at least one function stage. The at least one function stage may retain a fixed-point notation of an intermediate step value and defines locally optimized data representations to fulfill a dynamic range and the intermediate step value includes at least one of an input value, a resultant value and an output value. The system may also include a normalizer within the at least one function stage that normalizes the input tensor data set into a smaller range and a look up stage within the at least one function stage that maps the normalized input tensor data set to an index memory store that outputs a difference between the normalized input tensor data set and a referenced value used to determine a lookup location in a memory store.

An extensible multi-precision data pipeline method, includes, reading 610 an input local data set that is stored in a local storage format, converting 612 the input local data set into an input tensor data set having a tensor format of vector width N by tensor length L and routing 614 the input tensor data set through at least one function stage resulting in an output tensor data set. The method also includes converting 616 the output tensor data set into an output local data set having the local storage format and writing 618 the output local data set to a local buffer.

The method may also include encapsulating multiple function stages into a fused operation, processing the input tensor data set on an element by element basis along the tensor length L in the at least one function stage and processing the input tensor data set in the at least one function stage. The method may also dynamically adjust the quantization through the at least one function stage and retain a fixed-point notation of an intermediate step value and defines locally optimized data representations to fulfill a dynamic range. The intermediate step value may include at least one of an input value, a resultant value and an output value. The method may also include normalizing the input tensor data set into a smaller range and mapping the normalized input tensor data set to an index memory store that outputs a difference between the normalized input tensor data set and a referenced value used to determine a lookup location in a memory store.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A hybrid computational system, comprising:
a configurable and programmable specialty hardware programmed by a central processing unit with model data determined by a graphical processor unit to implement neural networks associated with an extensible multi-precision data pipeline;
a memory interface controller;
a memory; and
a central interconnect;
wherein the extensible multi-precision data pipeline, comprises:
a local buffer that loads input local data from the memory and stores the input local data set in a local storage format of either 32-bit fixed-point, 16-bit fixed-point, or s-bit fixed-point;
an input tensor shaper coupled to the local buffer that reads the input local data set in the local storage format in the local buffer and converts the input local data set into an input tensor data set having a 2-dimensional tensor format of vector width N by tensor length L wherein N and are integers;
a cascaded pipeline coupled to the input tensor shaper that routes the input tensor data set through at least one function stage resulting in an output tensor data set;
element-wise stage within the at least one function stage that processes the input tensor data set on an element by element basis along the tensor length L;
an output: tensor shaper coupled to the cascaded pipeline that converts the output tensor data set into an output local data set having the local storage format; and
wherein the output tensor shaper writes the output local data set to the local huller to be stored on the memory.

2. The system of claim 1, wherein the extensible multi-precision data pipeline further comprises an encapsulator coupled to the cascaded pipeline to fuse multiple function stages into a fused operation.

3. The system of claim 1, wherein the cascaded pipeline allows multiple operations to be computed in inline fashion and save memory bandwidth.

4. The system of claim 1, wherein the extensible multi-precision data pipeline further comprises a tensor-wise stage within the at least one function stage that processes the input tensor data.

5. The system of claim 1, further comprises a quantizing adjuster within the at least one function stage that dynamically adjusts quantization through the at least one function stage.

6. The system, of claim 1, wherein the at least one function stage retains a fixed-point notation of an intermediate step value and defines locally optimized data representations to fulfill a dynamic range.

7. The system of claim 6, wherein the intermediate step value includes at least one of an input value, a resultant value and an output value.

8. The system of claim 1, wherein the extensible multi-precision data pipeline further comprises a normalizer within the at least one function stage that normalizes the input tensor data set into a smaller range.

9. The system of claim 8, wherein the extensible multi-precision data pipeline further comprises a look up stage within the at least one function stage that maps the normalized input tensor data set to an index memory store that outputs a, difference between the normalized input tensor data set and a referenced value used to determine a lookup location in a memory store.

10. A hybrid computational system, comprising:
a configurable and programmable specialty hardware connected to a configurable and programmable specialty hardware controller which interfaces with a direct memory access connected to an input buffer and an output buffer, which are both connected to the configurable and programmable specialty hardware; and
a central processing unit connected to a main switch configured to shuttle data and commands to the direct memory access;
wherein the hybrid computational system is configured to implement neural networks associated with an extensible multi-precision data pipeline method, comprising the steps of:
reading an input local data set from the direct memory access to the input buffer that is stored in a local storage format of either 32-bit fixed-point, 16-bit fixed-point, or 8-bit fixed-point;
converting the input local data set in the local storage format on the input buffer into an input tensor data set having a 2-dimensional tensor format of vector width N by tensor length L, wherein N and L are integers;
routing the input tensor data set through at least one function stage resulting in an output tensor data set;
processing the input tensor data set on an element by element basis along the tensor length L in the at least one function stage converting the output tensor data set into an output local data set having the local storage format;
and
writing the output local data set to the output buffer to be stored on the direct memory access.

11. The system of claim 10, wherein the extensible multi-precision data pipeline method further comprises the step of encapsulating multiple function stages into a fused operation.

12. The system of claim 10, further comprises the step of processing the input tensor data set in the at least one function stage.

13. The system of claim 10: wherein the extensible multi-precision data pipeline method thither comprises the step of dynamically adjusting quantization through the at least one function stage.

14. The system of claim 10, wherein the extensible multi-precision data pipeline method further comprises the step of retaining a fixed-point notation of an intermediate step value and defines locally optimized data representations to fulfill a dynamic range.

15. The system of claim 14, wherein the intermediate step value includes at least one of an input value, a resultant value and an output value.

16. The system of claim 10, wherein the extensible multi-precision data pipeline method further comprises the step of normalizing the input tensor data set into a smaller range.

17. The system of claim 16, wherein the extensible multi-precision data pipeline method further comprises the step of mapping the normalized input tensor data set to an index memory store that outputs a difference between the normalized input tensor data set and a referenced value used to determine a lookup location in a memory store.

18. The system of claim 1, wherein the configurable and programmable specialty hardware, the graphical processor unit, and the central processing unit are all interconnected with the central interconnect and further connected to the memory interface controller.

19. The system of claim 18, wherein the configurable and programmable specialty hardware is specifically connected to the memory interface controller via a programmable logic circuit to memory interconnect configured to minimize circuitry utilized.

20. The system of claim 1, wherein the memory interface controller is further connected to the memory, wherein the memory comprises at least one of the following: a persistent memory disk, a system memory, and a read only memory.

21. The system of claim 1, wherein the memory interface controller is further connected to the central interconnect.

22. The system of claim 1, wherein the central interconnect is further connected to an input and output interface and a network interface.

23. The system of claim 10, wherein the direct memory access if further connected to a SDRAM controller configured to allow data to be shuttled to and from the configurable and programmable specialty hardware device to the central processing unit.

24. The system of claim 10, wherein the SDRAM controller is further connected to an external SDRAM and the central processing unit.

25. The system of claim 10, wherein the main switch is further connected to a peripheral interface.

26. The system of claim 11, wherein the central process n knit is further connected to a flash controller configured to control persistent memory.

\* \* \* \* \*